No. 607,715. Patented July 19, 1898.
J. F. STEVENS.
VOLTMETER.
(Application filed Apr. 22, 1897. Renewed May 4, 1898.)
(No Model.) 2 Sheets—Sheet 1.
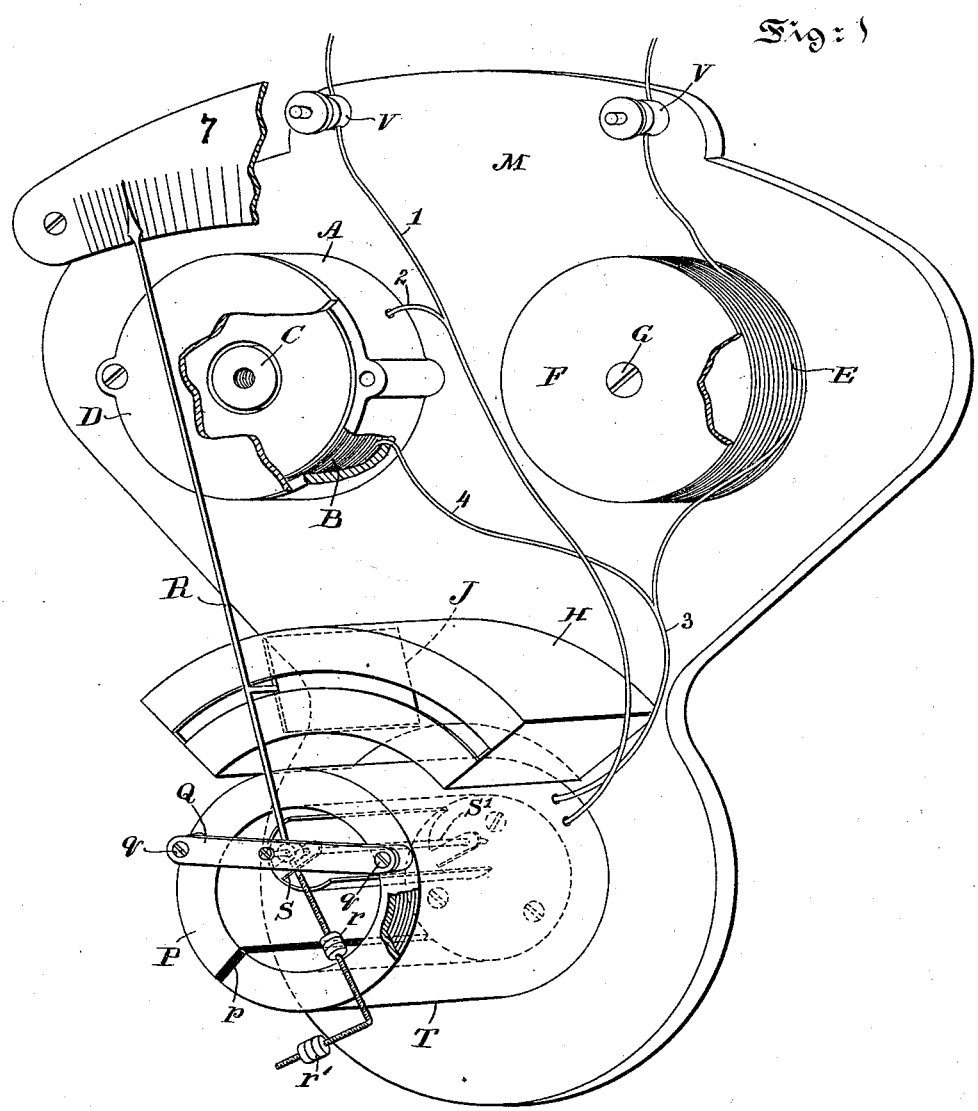
Witnesses:
W. A. Schaefer.
Wm. Hendrickson.
Inventor,
John Franklin Stevens.
By his Attorney No. 607,715. Patented July 19, 1898.
J. F. STEVENS.
VOLTMETER.
(Application filed Apr. 22, 1897. Renewed May 4, 1898.)
(No Model.) 2 Sheets—Sheet 2.
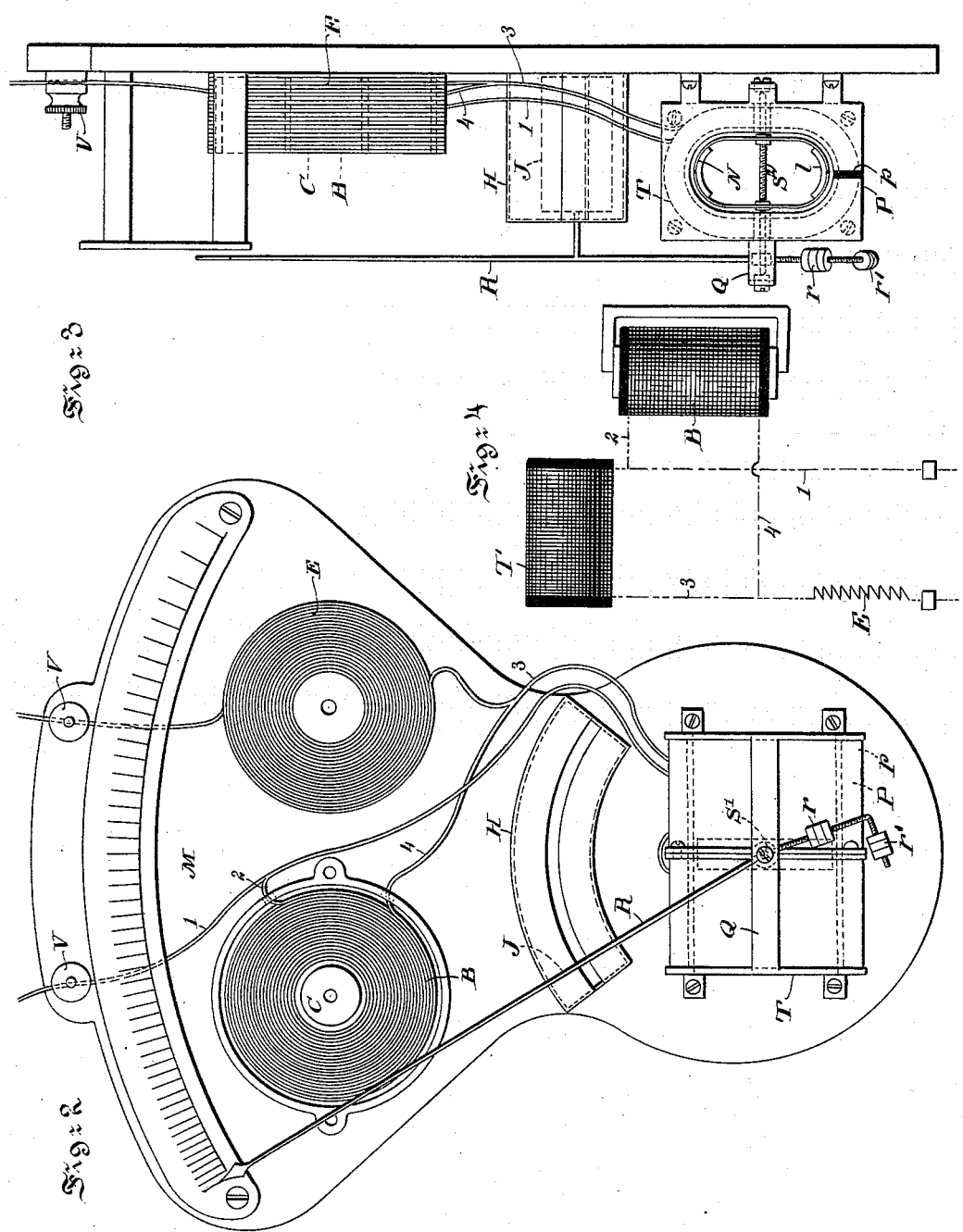

UNITED STATES PATENT OFFICE.

JOHN FRANKLIN STEVENS, OF PHILADELPHIA, PENNSYLVANIA.

VOLTMETER.

SPECIFICATION forming part of Letters Patent No. 607,715, dated July 19, 1898.

Application filed April 22, 1897. Renewed May 4, 1898. Serial No. 679,733. (No model.)

*To all whom it may concern:*

Be it known that I, JOHN FRANKLIN STEVENS, a citizen of the United States, and a resident of the city and county of Philadelphia and State of Pennsylvania, have invented a new and useful Improvement in Voltmeters, of which the following is a clear and sufficient description, reference being had to the drawings annexed.

My invented meter has for its object measuring with a single-scale instrument the potential of both alternating and direct currents. Its principle of operation consists in causing the same amount of current, measured in virtual or effective amperes, to flow through the working coil when an alternating current is passed through the instrument as when a direct current passes through the same, so that a field of force having an equal strength will be produced within the working coil with a current of the same potential whether this current be alternating or direct within the usual limits of measurement.

My device consists, essentially, in forming a shunt-circuit connected to the terminals of the working circuit of the instrument, the ratio of the impedance of which to the impedance of the working circuit is so much greater than the ratio of the resistance of the shunt-circuit to the working circuit of the instrument that a sufficiently larger proportion of the current flowing through the instrument will pass through the working coil when an alternating current passes than when a direct current passes to cause the field of force within the working coil to be substantially of the same strength, with current of equal potential, within the usual limits of measurement of the instrument, whether these currents be direct or alternating.

Describing now the best form of my invention, Figure 1 is a perspective view. Fig. 2 is a front elevation, and Fig. 3 is a side elevation, of a modification, and Fig. 4 a diagram showing the path of the currents.

I will proceed first to describe the mechanical construction of the said best form of my invented device of which I am now aware. I preferably construct my meter in the form of a wall instrument, in which M is the back plate. On this I mount the binding-screws V V to form the terminals of the instrument, the scale 7, and other necessary or usual parts of such descriptions of instruments, all of which may be of any usual and convenient construction. On this plate M, I in practice mount upon it also the measuring or working coil T, a non-inductively-wound coil E, the shunt-resistance B, and the damper-case H. In the coil T is placed the vane S, which causes the movement of the needle R. The electrical connections are the wire 3, by which the current passes through the resistance E to the coil T, and the wires 4 and 2, connected to the said wires 3 and 1, respectively, the wire 4 being connected between resistance E and the coil T, (see Fig. 4,) which are the means of bringing into shunt-circuit the coil B.

Describing now in detail the preferred construction of these various parts, the non-inductive resistance E is wound in the usual manner and is held in position by cover F and screw G. The measuring-coil T is wound upon the spool of non-inductive material P. If, however, this spool is made of an inductive material, it is split and a piece of non-inductive material P inserted. As will be explained below, the impedance of this coil is to be made as small as practicable. Between an attachment to the bottom plate of the spool P and the cross-piece Q is mounted the vane-spindle S', which carries the vane S, that is in the form of a curved sheet of metal. To this spindle is secured the needle R. I usually raise the bar Q sufficiently from the spool P to permit the needle being placed between these two and secure the bar by the screws *q q* to the standards erected on the spool. I balance the needle by means of two weights movable in directions preferably at right angles with each other on a counterpoise attached to the spindle S', said counterpoise being bent at right angles to itself. The weight *r* acts as a counterbalance for the needle merely, while the weight *r'* determines the zero-point of the needle.

The shunt-resistance coil B is made to produce a large impedance in proportion to its resistance. To further this purpose, I provide the coil with an iron casing A and core C, which are connected behind the coil, and the magnetic circuit being completed by the plate D, placed in contact with the core and casing, this iron should be sufficient in mass not to be saturated by any current measured by the instrument. This construction largely increases the self-induction of the shunt-coil, and hence its impedance, and so diminishes the quantity of the current that would pass through it on an alternating-current circuit.

The vane S is formed of a curved sheet of magnetic metal and is attached to the vane-spindle S'. The damper J moves in the damper-box H.

The operation of my device is as follows: When the current passes through the instrument, a portion of the current passes through the shunt-coil B and a portion through the working coil T. This latter produces the electric field within the working coil and causes the movement of the needle through the vane S, seeking to pass from a weaker to a stronger part of the field produced in T. There is more current passing through the shunt-coil when a direct current passes than when the current passing is alternating.

In Figs. 2 and 3 are illustrated a modification of my invented device in which the coil T is placed with its axis parallel to the plate M. In this coil is placed the vane N, mounted upon the rod S². This vane is preferably elliptical in shape and is split at the extremities of the major axis, being held in shape by the non-magnetic pieces l l.

While I have described the mechanical features of my device with some minuteness, I do not wish to be regarded as restricting myself to the device as thus described, because many changes can be made therein without departing from my invention.

Having now described my invented device, what I claim, and desire to secure by Letters Patent, is—

1. The combination in voltmeters of a working coil, and a resistance-coil in shunt with said working coil, the ratio of the resistance of the shunt-coil to the resistance of the working coil, being by that much less than the ratio of the impedance of the shunt-coil to the impedance of the working coil, that the field of force produced by the working coil will be substantially the same, within the usual limits of measurement, at the passage of an alternating current as at the passage of a direct current of the same potential as the alternating current, substantially as described.

2. The combination in a voltmeter of a working coil, and a resistance-coil connected in shunt across the terminals of the working coil said resistance-coil being provided with means for increasing the impedance in greater proportion than the resistance substantially as described.

3. The combination in a voltmeter of a working coil electrically connected to the terminals of the meter a non-inductive resistance introduced between one of the terminals and the working coil a shunt-coil electrically connected to the terminals of the working coil, the ratio of the resistance of the shunt-coil to the resistance of the working coil being by that much less than the ratio of the impedance of the shunt-coil to the impedance of the working coil, that the fields of force produced by the working coil will be substantially the same, within the usual limits of measurement, at the passage of an alternating current as at the passage of a direct current of the same potential as the alternating current, substantially as described.

4. The combination in a voltmeter of a working coil a resistance-coil, connected in shunt across terminals of the working coil, the ratio of the impedance of the shunt-coil to the impedance of the working coil being sufficiently greater than the ratio of the resistance of the shunt-coil to the resistance of the working coil to cause the field of force within the working coil to be substantially of the same strength at the passage of an alternating current of a certain potential as at the passage of a direct current of the same potential, and a non-inductive resistance interposed in the instrument substantially as described.

5. In a voltmeter a resistance-coil connected in shunt across the terminals of the working coil and provided with a core and casing of iron which forms a magnetic circuit the amount of iron being sufficient not to be saturated by the current passing through the instrument substantially as described.

6. In a voltmeter a working coil, vane, needle, and counterpoise; the latter being bent near the bottom and having thereon two weights adjustable upon said counterpoise one being mounted upon either side of the bend in the counterpoise substantially as described.

JOHN FRANKLIN STEVENS.

Witnesses:
MARK WILKS COLLET,
P. J. O'LEARY.